Figure 1:
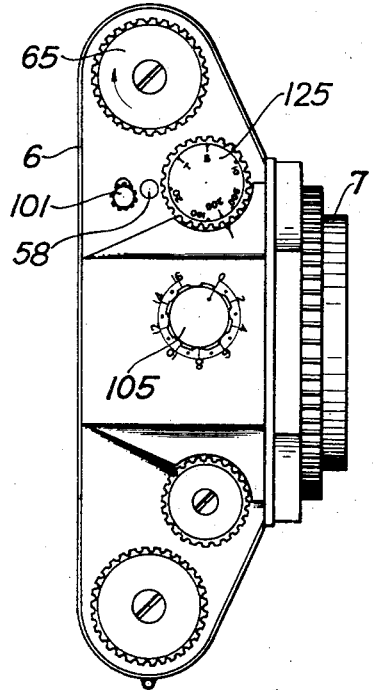

Nov. 14, 1939.   O. WITTEL   2,180,028
SHUTTER SETTING AND FILM WINDING MECHANISM
Filed April 12, 1938   3 Sheets-Sheet 1

Otto Wittel
INVENTOR

BY
ATTORNEYS

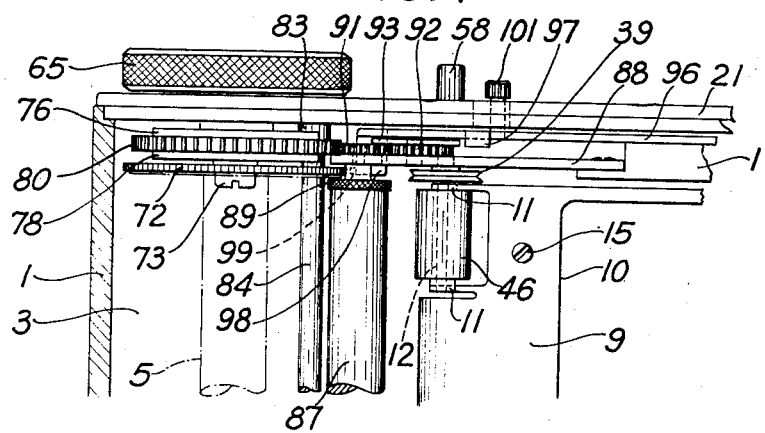

Nov. 14, 1939.  O. WITTEL  2,180,028
SHUTTER SETTING AND FILM WINDING MECHANISM
Filed April 12, 1938  3 Sheets-Sheet 3
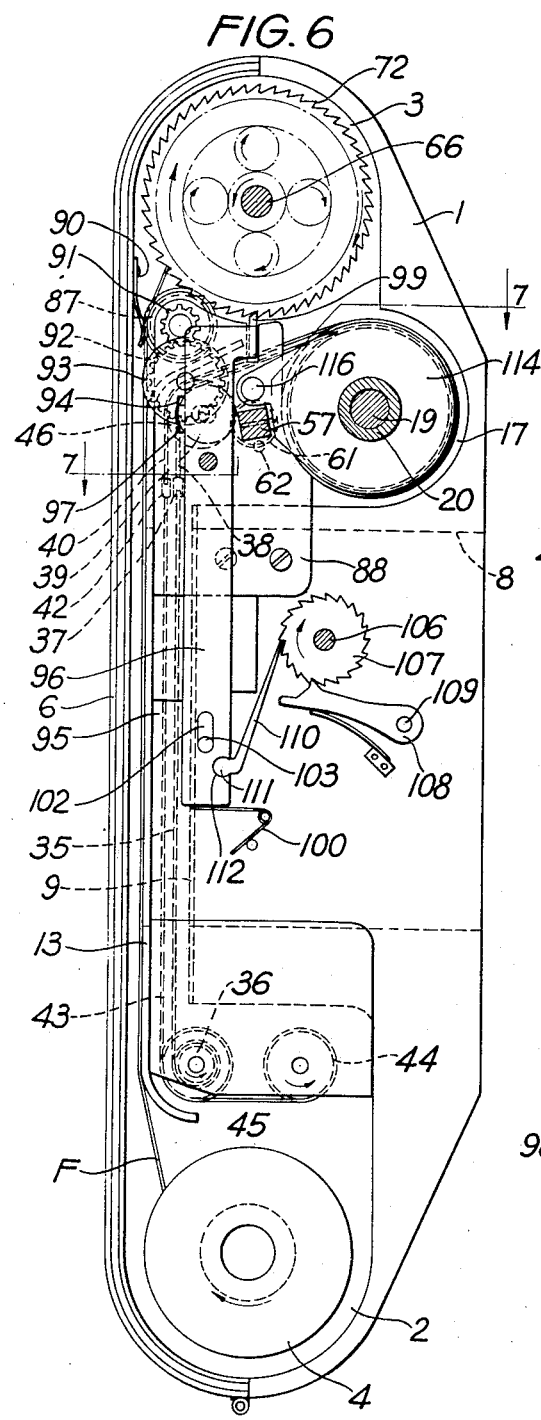
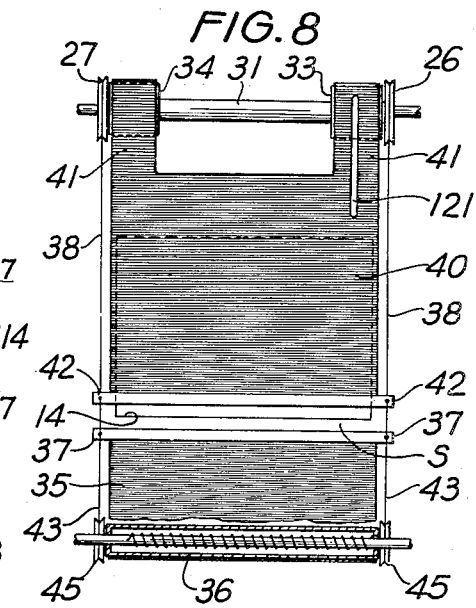
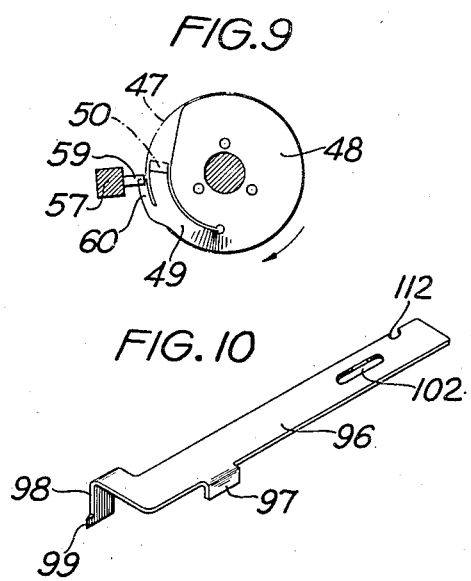
Otto Wittel
INVENTOR Patented Nov. 14, 1939

2,180,028

UNITED STATES PATENT OFFICE 2,180,028

SHUTTER SETTING AND FILM WINDING MECHANISM

Otto Wittel, Rochester, N. Y., assignor to Eastman Kodak Company, Rochester, N. Y., a corporation of New Jersey Application April 12, 1938, Serial No. 201,539

9 Claims. (Cl. 95—31)

The present invention relates to cameras of the type having focal plane shutters, and particularly to an arrangement wherewith the shutter is set and the film advanced through the actuation of a single member.

Cameras equipped with focal plane shutters usually have two separate winding members on the outside of the body which must be manually operated after each exposure. One of these winding members is for advancing the film strip the proper distance for a new exposure, and the other is a winding member for setting the shutter, which is effected by winding the curtain onto the wind-up drum. It will be obvious to those skilled in the art that where two such separate operations must be performed between each exposure, and the operation of two separate members is required to perform these operations, it is no wonder how an operator attempts to take a picture having performed only one of the necessary operations, having overlooked the other. Due to such occurrences much film is wasted through double exposure, or an interesting shot is lost forever because the shutter has not been set. Further, it will be appreciated that to operate two separate winding members to set the shutter and wind the film will require more time than would be required if the two operations could be accomplished through one winding member; and this difference in time might mean the difference between getting the desired picture or missing it forever.

Therefore, one object of the present invention is to provide in a camera having a focal plane shutter, an arrangement whereby the film will be advanced and the shutter will be set through the actuation of a single winding knob. Another object is to provide such a camera whereby the film takeup spool is automatically stopped after the required length of film has been advanced, doing away with the necessity of watching exposure numbers through the back of the camera; and to provide an automatic means for stopping the shutter wind-up drum after the shutter is set. And still another object is to provide a differential drive between the winding knob, the takeup film spool, and the shutter windup drum so that when the winding knob is rotated the takeup spool or the wind-up drum, depending upon which one offers the least resistance, will be rotated to the position where it is automatically stopped, after which further rotation of the winding knob serves to wind the other member to its final position after which the winding knob itself is locked against further rotation giving the indication that the film is wound and the shutter is set ready for an exposure. Another object is to provide an epicyclic gear train in the form of a planetary gearing to provide this differential drive, which type of gearing is particularly adapted for use in a limited space such as is available for such mechanism in a camera having a shutter of the focal plane type. And a further object is to provide an arrangement of the type described which is simple in construction, efficient in operation, and wherewith to set the shutter and wind the film it is only necessary to rotate a single knob until it is locked against rotation.

Briefly, my invention comprises connecting the film takeup spool and the shutter wind-up drum to a single winding knob through a planetary gearing. With such an arrangement rotation of the winding knob will first serve to wind up the member offering the least resistance until it comes to a stop, after which further rotation of the winding knob will rotate the other until it comes to a stop. When the takeup roll has come to a stop after advancing the film, and the wind-up drum has come to a stop after setting the shutter, the winding knob will be locked against further rotation giving an indication that these necessary operations have been completed and the camera is ready for a new exposure.

Figure 2:
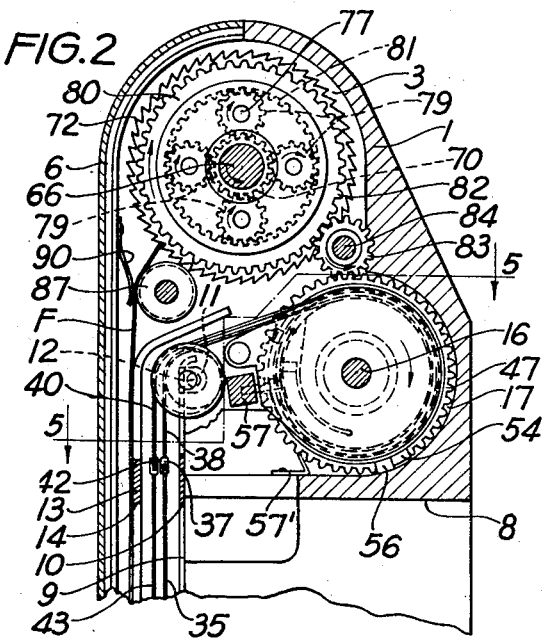
Figure 3:
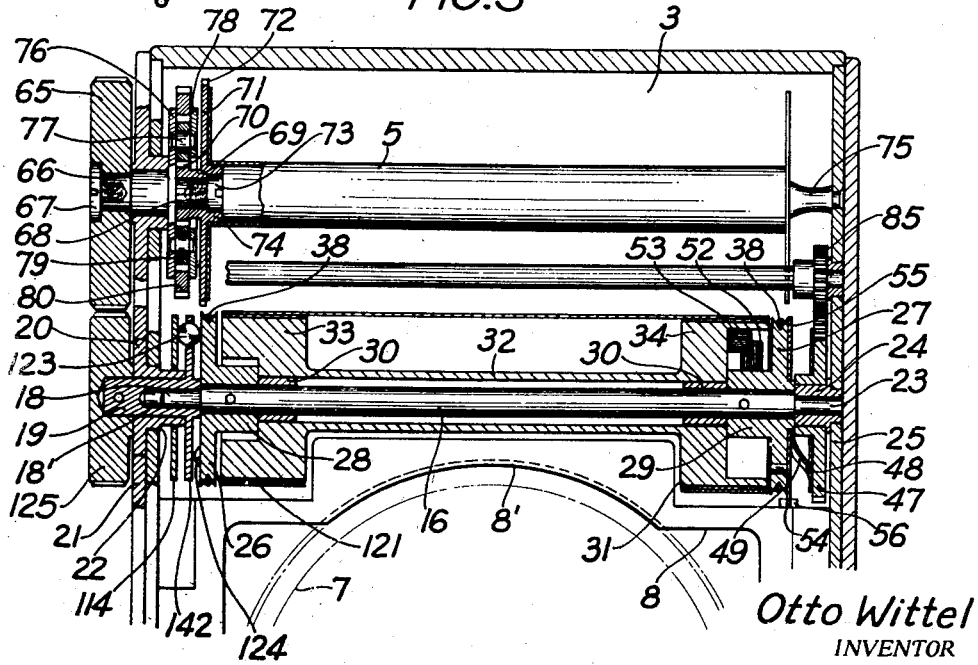

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which, Fig. 1 is a top plan view of a camera embodying this invention, Fig. 2 is an enlarged plan view, partly in section, of one end of the camera with the top plate removed, and showing the planetary gearing between the winding knob, takeup spool, and the wind-up drum of the shutter, Fig. 3 is an enlarged sectional elevation of one end of the camera showing the connection between the wind-up drum, the takeup spool, and the winding knob, Fig. 4 is a partial rear elevation of a camera with the back removed for loading, and showing the film measuring mechanism, Fig. 5 is a section taken substantially on line 5—5 of Fig. 2, and showing the release for the following blind operated from the speed setting mechanism, Fig. 6 is an enlarged plan view of the camera with the top plate removed, Fig. 7 is a section taken substantially on line 7—7 of Fig. 6, and showing the shutter release mechanism, Fig. 8 is an elevation, partly in section, of the shutter curtains separated from the enclosing part of the mechanism and in a somewhat diagrammatic form, Fig. 9 is a section taken substantially on line 9—9 of Fig. 7, and Fig. 10 is a detail of the slide which is part of the film measuring mechanism, and which stops the takeup spool after a given length of film has been advanced.

Like reference characters refer to corresponding parts throughout the drawings.

A shutter setting and film winding mechanism constructed in accordance with a preferred embodiment of the present invention is shown mounted in a compact camera wherein a camera body 1, having film spool chambers 2 and 3 for the supply and takeup film spools 4 and 5 respectively, has a back or closure 6 which is removable from the camera body for loading the film into the camera. The camera objective is carried in a lens mount 7 which can be mounted on the camera body in any suitable manner so as to be received within the same for carrying purposes, i. e. folding bed and bellows, telescoping lens mount, etc., and for the purpose of illustration I have shown a camera constructed so as to receive the lens mount in telescopic relation in a recess in the front of the camera whereby it is adapted to receive in the recess 8 in the camera body when collapsed. This recess 8 has arcuate portions 8' which may be internally threaded with threads of steep pitch, and in threaded engagement with which the mount may be arranged so as to be screwed into and out of the camera body. Since the method of mounting the lens on the camera body has no bearing on the present invention, the particular structure used is of no consequence, and is not specifically shown in the drawings.

Behind the recess 8 is situated a frame 9 having a rectangular aperture 10 equal in size to the picture which is to be taken. The aperture 10 in the frame 9 will be equal in dimension to the rectangular outline of the recess 8 into which the lens mount telescopes, and will serve to prevent the lens upon telescoping to its retracted position from accidentally engaging the shutter curtains. This frame may be fastened to the camera body 1 by screws 15, and is provided with ears 11 for supporting the stub shafts 12, see Fig. 4. Situated in the camera body 1 behind and spaced from the frame 9 is the customary film guide plate 13 over which the film F is threaded in moving from the supply spool 4 to the takeup spool 5. This plate 13 may be grooved to receive the film strip to properly position it in the focal plane of the lens, and is provided with an exposure aperture 14 which determines the picture size on the film, and into a position relative to which the film is moved for exposure.

While the focal plane shutter may be of any well-known type, for the purpose of illustration I have shown one of the two-curtain type, generally known as a self-capping shutter. The wind-up drum for the shutter includes a shaft 16 which extends across the camera body 1 and is rotatably mounted in a recess 17 in said camera body. One end 18 of the shaft 16 is rotatably mounted in the bore 18' of the stud 19, which stud in turn extends through and is rotatably mounted relative to the sleeve 20 extending through and fixed to the top wall 21 of the camera body by the flared portion 22. The other end 23 of the shaft 16 is rotatably mounted in the bearing 24 fixed to the inside face of the bottom wall 25. Pinned to the shaft 16 adjacent the ends thereof are wind-up pulleys 26 and 27 having trunnions 28 and 29 respectively. Rotatably mounted relative to the shaft 16 and spaced therefrom by bearing sleeves 30 is a wind-up roller 31 which has a reduced hollow shank 32 and enlarged curtain supporting ends 33 and 34.

The front or leading curtain 35 has one end fastened to the spring roller 36 onto which it is wound in winding off, and the other end thereof is provided with a cross strip 37 to the ends of which are fastened cords 38 fixed to and passing over the wind-up pulleys 26 and 27. The cords 38 pass over guide pulleys 39 in passing to wind-up pulleys 26 and 27, these guide pulleys being located so as to direct the curtain 35 in a path parallel to the plane of the exposure aperture. The rear or following curtain 40 is cut out at one end to provide straps 41 which are attached at their ends to and pass over curtain supporting ends 33 and 34 of the wind-up roller 31. The other end of the curtain 40 is provided with a cross strip 42 to the ends of which are fastened cords 43, the free ends thereof being fixed to spring operated pulleys 44 adjacent the spring roller 36, see Figs. 6 and 8. In passing to the spring pulleys 44 the cords 43 pass over guide pulleys 45 coaxial with the spring roller 36 so as to maintain the curtain 40 parallel to the other curtain. These guide pulleys 45 are rotatable with respect to the spring roller 36, and are not affected by the spring action thereof at any time.

The top end of the following curtain 40 is maintained in parallel relation with the exposure aperture and properly guided onto the wind-up roller by passing over the guide rollers 46 which may be rotatably mounted on the stub shafts 12 supported by the frame member 9, which guide rollers are coaxial with the guide pulleys 39 and are of the same diameter and in alignment with the lower guide pulleys 45 for the following curtain. Referring to Fig. 8, it will be noticed that in moving from the wind-up drum to the wind-off spring roller and pulleys, the ends of the curtains are separated to provide the desired exposure slot S, which moves uniformly across the exposure aperture to give the desired exposure. When the curtains are wound up, the following curtain 40 moves first enough to close the slot S after which both curtains are wound up together. The width of the slot is variable to give different exposures, and the mechanism for controlling the width of the slot, as well as the proper winding up of the curtains will be described hereinafter. Since the following curtain 40 is wound up on the wind-up roller 31, and the leading curtain 35 is wound up on the wind-up pulleys 26 and 27, it will be appreciated that both must be operated to wind-up or "set" the shutter. Therefore, since the wind-up pulleys 26 and 27, and the wind-up roller 31 are connected to be operated from the same winding means, and are both actuated to wind up the shutter, the combination of the two can be referred to as the wind-up drum for the shutter when speaking of the shutter as a single element.

For winding up, or setting the shutter, and releasing the same, the following mechanism is provided. Rotatably mounted on the bearing 24 against the bottom wall 25 of the camera body is a spur gear 47 rotation of which drives the wind-up shaft to wind up the shutter. To the inside face of the spur gear 47 is attached a plate 48 having a spring finger 49 pressed away therefrom to engage a pin 50 extending from the face of the wind-up pulley 27, see Figs. 3 and 9. Thus when the spur gear 47 is rotated in the direction as indicated by the arrow in Figs. 3 and 9, the spring finger 49 picks up the pin 50 and causes rotation of the wind-up pulleys 26 and 27, and the shaft 16 connecting the same. This rotation serves to wind-up the leading curtain 35. Referring to Fig. 3, it will be noticed that a pin 52 extending radially from the trunnion 29 of the pulley 27 abuts and picks up pin 53 extending axially from the curtain supporting end 34 of the wind-up roller 31 so that the wind-up roller 31 is rotated along with the wind-up pulley when the spur gear 47 is rotated in the right direction. This serves to wind up the following curtain 40 in conjunction with the winding up of the leading curtain. In the drawings, with the exception of Fig. 8, the parts are shown in the position they will assume when the shutter is wound up or set, and this position is automatically determined when the projecting end 54 of the plate 55 fixed to the inside face of the wind-up pulley 27 engages the stop member 56 fixed to the camera body and extending radially into the recess 17. To prevent the spur gear from rotating in the wrong direction due to the spring tension on the shutter, I have shown a spring 57' fixed in the recess 17 to ride on the teeth of the spur gear 47 in the manner of a pawl and ratchet. It is to be understood that this effect can be obtained by placing a one-way clutch mechanism between the gear 47 and the bearing therefor.

The pins 52 and 53 on the wind-up pulley 27, and on the wind-up rollers 31 respectively are so positioned relative to one another that when they are in driving abutment the leading and following curtains are in an overlapped position so that they prevent all passage of light through the exposure aperture. The curtains will be in this relation from the time they are completely wound off until they are completely wound up. The shutter is released when the spring finger 49 attached to the spur gear 47 is removed from the path of the pin 50 on the wind-up pulley 27 whereupon the spring roller 35 and the spring operated pulley 44 act to pull the curtains 35 and 40 across the exposure aperture 14 at a uniform speed and with a given slot S between the ends of the two. The width of the slot S may be varied by a speed setting mechanism which will be described hereinafter.

In winding off, the travel of the leading curtain 35 will be stopped when the pulley 27 makes practically a complete revolution and the projection 54 of the plate 55 abuts the opposite side of the stop member 56. The travel of the following curtain 40 will be stopped when the pin 52 on the trunnion 29 completes practically a complete revolution to abut the pin 53 on roller 31 in which position the curtains will be overlapped and in position to be wound up in such overlapped position. The shutter release includes a push rod 57 extending through the camera body 1 adjacent the shutter wind-up drum and slidably supported at its opposite ends.

The push button 58 is attached to this push rod 57 and extends to the outside of the camera body. Extending from the push rod 57 adjacent the spur gear 47 is an arm 59 which is adapted to engage an extension 60 formed on the spring finger 49, see Fig. 9. When the push button 58 is pressed downwardly, the push rod 57 is slid parallel to the axis of the wind-up drum and the arm 59 thereon presses against the extension 60 and springs the spring finger 49 out of engagement with the pin 50 whereupon the shutter is allowed to wind off. The push rod 57 is normally moved to its inoperative position by a coil spring 61 which has one end engaging a hole in the push rod while the other end thereof is held by a pin 62 fixed to the supporting plate 88 in the camera body 1. The extension 60 is required on the spring finger 49 because of the limited nature of the space available between the spring finger and the wind-up pulley does not permit the arm 59 to extend far enough to engage the finger proper without interfering with the pulley 27. It will be noticed by referring to Fig. 7 that this extension 60 extends beyond the periphery of the pulley 27 so that the arm can engage the same without interfering with the pulley.

Coming now to the arrangement for winding the film and shutter from the same winding knob, it will be noticed, by referring particularly to Figs. 2 and 3, that the winding knob 65 is fixed to the stub shaft 66 extending through and rotatable relative to the camera wall 21 by the screw 67. Although it has not been shown or described, this stub shaft 66 may be provided with a one-way clutch which would serve to allow rotation of the winding knob 65 in only the proper direction, that indicated by the arrow in Fig. 1. On a reduced end 68 of the stub shaft 66 is rotatably mounted a sleeve member 69 integral with one end of which is a gear 70 and integral with the other end of which is a radially extending flange 71 the periphery of which is provided with ratchet teeth 72. The sleeve member 69 is rotatably held on the reduced end 68 of the stub shaft by the bolt 73. The outer face of the flange 71 is provided with a pair of lugs 74 which are diametrically opposite one another and form a key which fits into the customary keyway in the end of the takeup film spool 5 to drivingly connect the same to the flange 71. The other end of the film spool is placed on a stud 75 fixed to and extending from the bottom wall 25 of the camera body, and relative to which the spool is rotatable. This manner of mounting a takeup spool in a camera to be drivingly connected to the winding key is well known in the art, and I have only modified said construction by drivingly connecting the spool to the sleeve member 69 instead of directly to the winding key proper.

Fixed to and rotatable with the stub shaft 66 is a flange 76 from which extends a plurality, in this case four, of studs 77 to the other end of which is fixed an annular ring 78. These studs 77 are circumferentially spaced around the flange 76 relative to one another, and rotatably mounted on each stud between the flange 76 and the annular ring 78 is a pinion 79 which meshes with the gear 70 fixed to the sleeve member 69. Rotatably mounted between the flange 76 and the annular ring 78 is a ring gear 80, and this ring gear is of such size that, when mounted as described, the internal teeth 81 thereof mesh with the teeth of each of the pinions 79. The external teeth 82 of the ring gear 80 mesh with a pinion 83 fixed to the shaft 84 rotatably mounted in the top and bottom walls 21 and 25 of the camera, and rotation of this shaft is transmitted to the spur gear 47 through engagement of said spur gear with the gear 85 fixed to the other end of the shaft 84. With this described planetary gearing arrangement the shutter can be wound up and the film can be advanced through rotation of the winding knob 65 each independently of the other. For instance, when the winding knob is rotated in the direction indicated by the arrow in Fig. 1, either the shutter wind-up drum or the film takeup spool will be rotated first, depending upon which offers the least resistance to movement, until it has been fully wound after which further rotation of the winding knob will serve to wind up the other to its full wound-up position. When both the shutter and film have been wound up and have come to a stop, the winding knob will be locked against further rotation thereby giving an indication that these steps have been accomplished.

By way of explaining the action of this planetary gearing, let us assume that an exposure has just been made and the shutter is ready to be set and the film is to be advanced. Assuming that the shutter offers the least resistance to movement, when the winding knob 65 is rotated the pinions 79 will be rotated around the gear 70, which is connected to the takeup spool 4, and the ring gear 80 will be rotated by rotation of said pinions to drive the spur gear 47 and wind up the shutter until the projection 54 on the pulley 27 engages the stop member 56 in which position the shutter is fully wound and can be wound no further. Now since the gear train driven by the ring gear 80 and the ring gear itself is held against further movement, upon continued rotation of the winding knob 65 the pinions 79 will run around the inside of the ring gear and will drive the gear 70. This causes rotation of the sleeve 69 and along with it the flange 71 to which the takeup spool 4 is keyed, so that the film is wound. The winding knob 65 can be rotated until the sleeve 69 is automatically stopped and positively held against further rotation through the action of a film measuring mechanism described hereinafter. When both the shutter wind-up drum and the takeup spool have been advanced the required amount and are positively held against further movement, both the ring gear 80 and the gear 70 are held against rotation so that the pinions 79 cannot be rotated around the axis of the stub shaft 66 and the winding knob is therefore locked against further rotation. It will be readily understood by those skilled in the art that should the resistance to movement be equal in the film winding and shutter winding mechanisms, that rotation of the pinions 79 by knob 65 will cause both the ring gear 80 and the gear 70 to rotate in the proper direction, see arrows in Fig. 2, at the same time. Under these conditions the film will be advanced and the shutter will be wound simultaneously until the resistances in the two become unequal whereupon one will move while the other stands substantially still, as described above. It is pointed out that one or more pinions 79 may be used and function as described, but I have found that four spaced as shown give a most satisfactory result in that binding between the ring gear 80, gear 70, and the pinions 79 is eliminated.

Referring now particularly to Figs. 1, 4, 6, and 10, the film measuring and exposure counting mechanism includes a film measuring roller 87 which extends across the camera body in the path of the film F and which is rotatably mounted at either end in supporting plates 88 positioned in the camera body. This measuring roller is substantially equal in width to the film strip, and either end of the roller is provided with flanges 89 the peripheries of which are roughened in any suitable manner, as by knurling. The film, which is unperforated, in passing from the supply spool to the takeup spool is supported at its edges by these roughened flanges so that movement of the film serves to rotate said measuring roller. It is absolutely essential in measuring the film advance that there be no slippage between the film strip and the measuring roller, hence the reason for roughening the flanges of said roller. Further assurance against slippage at this point is provided by the spring fingers 90 which are mounted in the camera body and engage each edge of the film adjacent said measuring roller to press the edges of the film into engagement with said rough flanges. Most cameras of this type, where the film advance is controlled by a measuring roller, are adapted for use with film which is perforated along its edges, and wherewith the measuring roller can take the form of a toothed sprocket to positively engage these perforations. With this type of structure there is no chance of slippage between the measuring roller and the film strip, and the measuring roller is usually geared to the shutter winding mechanism so that the film is fully advanced and the shutter is set simultaneously in which case no differential drive between the two is needed. However, it will be readily appreciated that where unperforated film is used, as in this instance, this positive drive between the film and measuring roller is not manifest, and to overcome the effect of any slippage which might cause the film wind up to lag behind the setting of the shutter, a differential drive of the type described is indispensable.

Rotatable with the measuring roller is a pinion 91 which is in engagement with a gear 92 to the face of which is fastened a disk 93 having a slot 94 extending radially from the periphery thereof toward the center thereof. Slidably mounted on a partition 95 adjacent the top wall 21 of the camera is a slide 96 which has a downturned projection 97 which is adapted to engage the slot 94 in the disk 93 when the film has been wound, see Fig. 6. The end of the slide is provided with an offset arm 98 the end 99 of which acts as a pawl to engage the ratchet teeth 72 of the periphery of the flange 71 to hold the film takeup spool 4 from rotating.

The slide 96 is normally spring pressed into the position shown by a spring 100, in which position the projection 97 and the end 99 of the arm 98 engage the ratchet teeth 72 and the slotted disk 93 to automatically stop and hold the takeup spool against rotation. Movement of the slide 96 to the locking position shown depends upon the disk 93 being in the position where the projection 97 is admitted to the slot 94 in the disk 93, and since this disk is rotated from the film measuring roller 87 the slide can move to this position only after a given length of film has been advanced. Before the film can be advanced after an exposure, the slide 96 must be moved against the spring 100 to disengage the projection 97 from the slot 94 in the disk and to remove the end 99 of the slide 98 from the ratchet teeth 72. This movement of the slide is effected by pressing against the button 101 connected to the slide and extending through a slot in the camera wall 21 to the outside thereof. Movement of the slide is limited in each direction by the length of the slot 102 in the slide 96 in which rides on a pin 103 projecting from the partition 95. As the slide 96 is moved to release the projection 97 from the slot 94 in the disk, the tension in the film will serve to move the measuring roller 87 a sufficient amount to cause rotation of the disk to a position wherein the slot is just out of alignment with the projection 97. With the projection thus engaging the periphery of the disk, the slide will be held in a retracted position against the action of the spring 100 wherein the end 99 of the arm 98 will be moved from engagement with the ratchet teeth 72. The slide will be held in this retracted position until the disk 93 makes one complete revolution and the slot 94 therein comes again into alignment with the projection 97, whereupon the slide will return to its locking position. The gearing between the measuring roller 87 and the disk 93 will be such that the advance of a given length of film over the roller will cause one rotation of the disk after which the slide 96 will automatically move to its locking position, and I have found that a 2 to 1 ratio between the pinion 91 and the gear 92 driving the disk will give a satisfactory relation between the measuring roller and the disk 93.

The exposure counter includes a numbered knob 105 which is rotatably mounted on the top wall 21 of the camera. This knob is rotatably mounted on a shaft 106 extending through the camera wall and to the lower end of which is mounted a ratchet 107. This ratchet is engaged and held against rotation in the wrong direction by a spring pressed pawl 108 pivoted at 109 to the under side of the camera wall 21. A finger 110 is mounted to slide with the slide 96, having a round end 111 integral therewith set into a circular recess 112 in the edge of the slide 96, and this finger engages the ratchet 107. By means of this construction it will be understood how the sliding movement of the slide 96 after each advance of the film will serve to move the ratchet member 107 through one step to cause the partial rotation of the knob 105 and thereby indicate an exposure. After the new film has been threaded into the camera, counter knob 105 will be set to zero with a fixed index mark on the camera wall, and thereafter at each winding of the film the counter will be rotated step by step to give the operator an indication of how many exposures he has made on the roll of film in the camera.

To control the exposure, the width of the slot S between the ends of the leading and following curtains 35 and 40 respectively, in moving past the exposure aperture 14 in winding off, is varied to let through different quantities of light. This exposure control, or shutter speed as it may be called, is effected in the following manner. Referring to Figs. 3, 5, and 7, an aperture plate 114 is slidably mounted on the sleeve 20 extending through the wall 21 of the camera body, and has attached thereto a finger 115 which extends parallel to the axis of the wind-up roller 31 and adjacent the periphery of the curtain supporting end 34 thereof. Also to the edge of the aperture plate 114 is attached one end of a rod 116 which is slidably mounted at its opposite ends in the supporting plates 88. A coil spring 118 surrounding the rod 116 and located between a shoulder 119 fixed thereto and one of the supporting plates 88 normally forces the rod 116 and along with it the plate 114 and the finger 115 to the left, looking at Figs. 5 and 7. It will be readily understood by referring to the drawings, that since the rod 116 is supported at both ends, this structure tends to hold the plate 114 in a horizontal position and allows the same to slide along the sleeve 20 without binding.

Fixed to and extending radially from the curtain supporting end 34 of the wind-up roller 31 is a pin 120 into the path of which the finger 115 normally extends. To permit this pin to extend through the following curtain 40 when the same is wound on the curtain supporting surface 34, the side of said curtain, see Fig. 8, may be provided with a slot 121 through which the pin 120 is adapted to extend when the curtain is wound up. In winding up, the round side of the pin 120 is adapted to engage an inclined end on the finger 116 to cam the same to the right and allow the pin to pass thereby, but after the pin passes said finger a flat side thereon engages the square side of the finger and the roller 31 is held in a wound up position by said finger.

Integral with the stud 19 and located between the face of the wind-up pulley 26 and the aperture plate 114 is a flange 142. This flange is provided with a ball seat in which is loosely located a ball 123, the surface of which contacts both the face of the pulley 26 and the face of the aperture plate 114. Located on the face of the pulley 26 is a semi-circular member 124 which is adapted, when the pulley rotates, to engage the ball 123 and force the same against the aperture plate 114 to thereby slide the plate along the sleeve 20 and remove the finger 116 from the path of the pin 120 on the end 34 of the wind-up roller 31. By means of this arrangement, when the curtains 35 and 40 are wound up and in a position shown, the movement of the shutter release button 58 causes the push rod 57 to disengage the spring finger 49 of the pin 50 on the wind-up pulley 27, whereupon the leading curtain 35 is released and starts to wind off. After the leading curtain is moved a given distance the semi-circular member 124 of the wind-up pulley 126 engages the ball 123 and effects the release of the finger 115 from the path of the pin 120 whereupon the following curtain 40 is released and allowed to wind off. The delay between the release of the leading curtain and the following curtain determines the width of the exposure slot S between the ends of the curtains as they pass the exposure aperture.

It will be readily understood that this delay can be varied by altering the relative position of the ball 123 with respect to the semi-circular member 124 when the curtains are in a wound-up position, or when the curtains are in any relative position. This relationship between the ball 123 and the semi-circular member 124 may be optionally altered by turning the shutter setting knob 125 pinned to the end of the stud 19 projecting to the outside of the camera, which serves to rotate the flange 122 and along with the ball 123 relative to the pulley 26. The setting knob may be marked with a plurality of speed indications around its periphery which when aligned with a fixed index on a camera wall will serve to indicate the speed for which the shutter is set.

With this arrangement for setting the shutter speeds, or the width of the slot S between the curtains moving past the exposure aperture, the setting knob 125 does not rotate as the shutter winds off, because there is no positive connection between the setting knob and the winding drum of the shutter. This, as will be appreciated, is a distinct advantage over previously used shutter setting arrangements where the setting knob rotates as the shutter winds off, where the shutter winds up, or both. Where the setting knob rotates with the shutter winding drum there is always a chance of the operator getting his fingers in the way of and interfering with said knob, which must necessarily be in an accessible position, and if this happens the winding off of the shutter is accidentally interrupted or entirely stopped and the exposure is either spoiled or is unsatisfactory due to an incorrect setting speed.

With the shutter setting and film winding arrangement above described, and constituting this invention, the film is advanced and the shutter is set through the actuation of a single winding knob. This arrangement therefore has the advantage over known structures, using separate winding knobs for each of these operations, in that where both the shutter is set and the film is wound by a single member the possibility of performing one operation and forgetting the other is eliminated. Further, by using the planetary gearing shown between the winding knob, the takeup spool, and the shutter wind-up drum, the shutter may be set and the film may be advanced independently of one another through rotation of the winding knob after which the winding knob is locked against further rotation indicating that these operations have been accomplished.

Although I have shown and described certain specific embodiments of my invention, I am fully aware that many modifications thereof are possible. My invention, therefore, is not to be restricted except insofar as is necessitated by the prior art, and by the spirit of the appended claims.

Having thus described my invention what I declare is new and desire to secure by Letters Patent of the United States is:

1. In a camera having an exposure aperture, the combination of means for feeding a film past said exposure aperture and into exposing position relative thereto, a shutter for alternately permitting and preventing light to pass through said exposure aperture, means for setting said shutter, an operating member movably mounted on the camera, and a differential gearing maintained between said operating member, said film feeding means, and said shutter setting means whereby the film can be fed and the shutter can be set simultaneously, or each independent of the other through movement of said operating member.

2. In a camera having an exposure aperture, the combination of means for feeding a film past said exposure aperture and into exposing position relative thereto, a focal plane shutter adapted to move past said exposure aperture to control the passage of light therethrough, means for winding up said shutter to set the same, an operating member movably mounted on the camera, and an epicyclic gear train between said operating member, said film feeding means, and said shutter setting means whereby the film is fed and the shutter is set through movement of said operating member.

3. In a camera having an exposure aperture, the combination of means for feeding a film past said exposure aperture and into exposing position relative thereto, a focal plane shutter adapted to move past said exposure aperture to control the passage of light therethrough, a wind-up drum onto which said shutter is wound when in a set position, a knob rotatably mounted on the camera, and a differential drive maintained between the film feeding means, the windup roll, and said knob whereby rotation of said knob serves both to advance the film and set the shutter independently of one another.

4. In a camera having an exposure aperture, the combination of a supply spool of film, a take-up film spool rotation of which advances the film strip across the exposure aperture from the supply spool, a curtain shutter movable across the exposure aperture, a spring driven roller for supporting one end of the curtain, a wind-up drum for supporting the other end of the curtain, a winding knob rotatably mounted on the camera, and a differential drive maintained between the winding knob, the take-up film spool and the wind-up drum whereby the film is advanced and the shutter is set independently of one another upon rotation of the winding knob.

5. In a camera having an exposure aperture, the combination of a supply spool of film, a take-up film spool rotation of which advances the film strip across the exposure aperture from the supply spool, a focal plane shutter comprising a leading blind and a following blind, means normally tending to move said blinds across the exposure aperture, wind-up means for moving said blinds across the exposure aperture to set the shutter, a winding knob rotatably mounted on the camera, and a differential gearing maintained between said winding knob, the take-up spool, and the wind-up means whereby the film is advanced and the shutter is set independently of one another upon rotation of the winding knob.

6. In a camera having an exposure aperture, the combination of a supply spool of film, a take-up film spool rotation of which advances the film strip across the exposure aperture from the supply spool, a focal plane shutter movable across the exposure aperture, and including a wind-up means for setting the shutter, a winding knob rotatably mounted on the camera, and a differential drive between the winding knob, the take-up spool, and the wind-up means whereby the take-up spool and the wind-up means are rotated independently of one another through rotation of the winding knob, until the film is advanced and the shutter is set, said differential drive comprising a planetary gearing connecting the winding knob, the take-up spool, and the shutter wind-up means.

7. In a camera having an exposure aperture, the combination of a supply spool of film, a take-up film spool rotation of which advances the film strip across the exposure aperture from the supply spool, a focal plane shutter movable across the exposure aperture, and including a wind-up drum supporting one end of the shutter and for setting the same, a winding knob rotatably mounted on the camera, a differential gearing connecting said winding knob, the take-up spool, and the wind-up drum whereby the film is advanced and the shutter set independently of one another through rotation of said winding knob, said gearing including a pinion connected to the winding knob to move in a path concentric with the axis of said winding knob upon rotation of the knob, a gear positively connected to the take-up spool and in mesh with said pinion, and a ring gear drivingly connected to the wind-up drum and in mesh with said pinion.

8. In a camera having an exposure aperture, the combination of a supply spool of film, a take-up film spool rotation of which advances the film strip across the exposure aperture from the supply spool, a focal plane shutter movable across the exposure aperture, and including a wind-up drum supporting one end of the shutter and for setting the same, a winding knob rotatably mounted on the camera, a differential gearing connecting said winding knob, the take-up spool, and the wind-up drum whereby the film is advanced and the shutter set independently of one another through rotation of said winding knob, said gearing including a plurality of rotatable pinions, spaced arcuately from one another and connected to the winding knob to move in a path concentric with the axis of said winding knob upon rotation of the knob, a gear positively connected to the take-up spool and in mesh with each of said pinions, and a ring gear drivingly connected to the wind-up drum and in mesh with each of said pinions.

9. In a camera having an exposure aperture, the combination of a supply spool of film, a take-up film spool rotation of which advances the film strip across the exposure aperture from the supply spool, means for automatically stopping the rotation of said take-up spool after each exposure for correctly positioning a new film area in the exposure aperture, a focal plane shutter movable across the exposure aperture, and including a wind-up drum supporting one end of the shutter and for setting the same, means for automatically stopping the movement of said wind-up drum when the shutter is set, a winding knob rotatably mounted on the camera, an epicyclic gear train connecting the winding knob, the take-up spool, and the wind-up drum whereby the film is advanced and the shutter set independently of one another through rotation of said winding knob, said gear train including a spur gear arranged coaxially with the winding knob, rotatable relative thereto, and positively connected to the take-up spool, a plurality of pinions in mesh with and spaced around the periphery of said spur gear, and connected to the winding knob to move around the spur gear upon rotation of the winding knob, and a ring gear surrounding and meshing with said pinions and rotatable relative to the winding knob, said ring gear geared to the wind-up drum to rotate the same.

OTTO WITTEL.